UNITED STATES PATENT OFFICE.

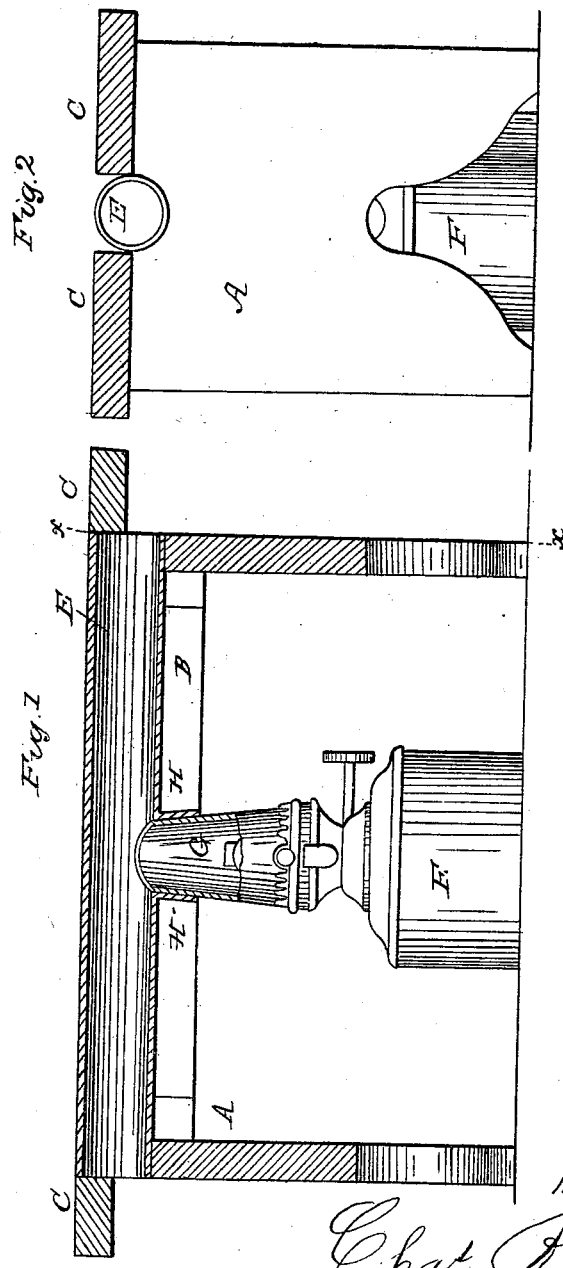

CHARLES R. EVERSON, OF PALMYRA, NEW YORK.

FOOT-WARMER.

Specification forming part of Letters Patent No. 59,374, dated November 6, 1866.

*To all whom it may concern:*

Be it known that I, CHARLES R. EVERSON, of Palmyra, in the county of Wayne and State of New York, have invented a new and useful Improvement in Foot-Warmers, &c.; and I do hereby declare that the following is a full, clear, and exact description thereof, which will enable others skilled in the art to make and use the same, reference being had to the accompanying drawings, forming part of this specification, in which—

Figure 1 is a vertical longitudinal central section of my improved foot-warmer. Fig. 2 is a vertical cross-section through the line $x\ x$, Fig. 1.

Similar letters of reference indicate like parts.

My invention has for its object the furnishing a convenient apparatus for heating footstools, foot-stoves, flat-irons, &c.; and it consists in combining a kerosene-lamp having a metallic chimney with a horizontal tube, as hereinafter more fully described.

A are the ends, B the sides, and C the top, of the foot-warmer.

The upper part or top of the foot-warmer is slotted longitudinally, as shown in the drawings. In this slot is placed a tube, E, with its ends resting in notches formed in the upper ends of the end pieces, A, of the foot-warmer. Beneath the foot-warmer is placed a kerosene-lamp, F, proportioned in size to the required amount of heat. Attached to the chimney-seat of this lamp, in the ordinary manner, is a metallic chimney, G, made of sheet-tin or of any other suitable metal. This metallic chimney G is connected with the horizontal tube E by having its upper end enter a short vertical pipe, H, descending from the tube E, the connection being similar to the connections or joints of a stove-pipe, as shown in Fig. 1. The tube or pipe E may be made round or flat, as may be convenient, and should have its ends open to secure a good draft to the lamp. By forming the pipe E with elbows the heated air from the lamp may be conducted in various directions and to a considerable distance.

The apparatus may be applied to various purposes, such as heating foot-warmers, foot-stoves, flat-irons, boiling water, cooking, &c.

I claim as new and desire to secure by Letters Patent—

The combination of a kerosene-oil lamp having a metallic chimney with a horizontal tube or pipe, substantially as described, and for the purposes set forth.

CHARLES R. EVERSON.

Witnesses:
W. F. ALDRICH,
GEO. W. CUYLER,
STEPHEN P. SEYMOUR.